United States Patent
Broom

[15] 3,663,897
[45] May 16, 1972

[54] METHOD OF MODULATING A LASER BEAM AND RELATED APPARATUS

[72] Inventor: Ronald Francis Johnston Broom, Zurich, Switzerland

[73] Assignee: Institut Fur Angewandte Physik Der Universitat Bern, Bern, Switzerland

[22] Filed: Feb. 6, 1970

[21] Appl. No.: 9,368

[30] Foreign Application Priority Data

June 6, 1969    Switzerland ........................... 1841/69

[52] U.S. Cl. .......................................... 332/7.51, 331/94.5
[51] Int. Cl. ........................................ H01s 3/18, H01s 3/12
[58] Field of Search ................................. 332/7.51; 250/199

[56] References Cited

UNITED STATES PATENTS 3,478,280  11/1969  Fenner ............................... 332/7.51
3,504,302  3/1970  Fenner ............................... 250/199

OTHER PUBLICATIONS

C. Lanza, "Method for Modulating the Width of an Injection Laser," 8/64, pg. 262 IBM Tech. J.

Primary Examiner—Benjamin A. Borchelt
Assistant Examiner—N. Moskowitz
Attorney—Waters, Roditi, Schwartz & Nissen

[57] ABSTRACT

A laser technique by which an additional resonator is coupled to a diode laser provided with a first resonator and driven by an adjustable current, the laser beam traversing the additional resonator and emerging through a semi-translucent component thereof. The emerging beam can be passed through a light switch controlled by a communication source.

11 Claims, 3 Drawing Figures

METHOD OF MODULATING A LASER BEAM AND RELATED APPARATUS

FIELD OF INVENTION

This invention relates to methods for modulating a laser beam which is produced by means of a diode laser energized by a tunable electric signal with an appropriate resonator, and further relates to associated apparatus.

SUMMARY OF INVENTION

The modulation of a laser beam with a steady carrier frequency which can then be modulated by radio-communication signals encounters very great difficulties. An object of the present invention is to avoid these difficulties.

The circuit, arrangement and method according to the invention are characterized by the fact that a diode laser has a second laser resonator coupled to it which is traversed by its beam and whose length can be adjusted so as to comply with the equation $$f_{10} = \frac{m \cdot c}{2\left\{l\left(n + v \cdot \frac{dn}{dv}\right) + L\right\}}$$

The meaning of the letters used in this equation will appear in the following description.

BRIEF DESCRIPTION OF DRAWING:

An embodiment of the invention is hereafter explained with reference to the accompanying drawing, in which.

Figure 1:
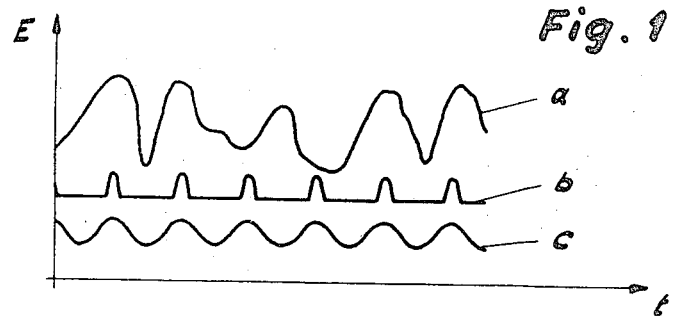
FIG. 1 is a wave diagram showing the fundamental pattern of the output power of one unmodulated laser beam and two modulated laser beams in terms of time.

DETAILED DESCRIPTION:

By measuring the pattern of the output power E of an unmodulated laser beam in terms of time $t$, for example, by use of a photodiode on which the beam is allowed to fall, there is obtained an irregular curve $a$ as shown in exaggerated form in FIG. 1.

The required result would be a regularly modulated pattern of the output power as shown in curves $b$ and $c$, curve $b$ showing regular positive pulses over a constant power level, and curve $c$ showing a sinusoidal modulation.

Figure 3:
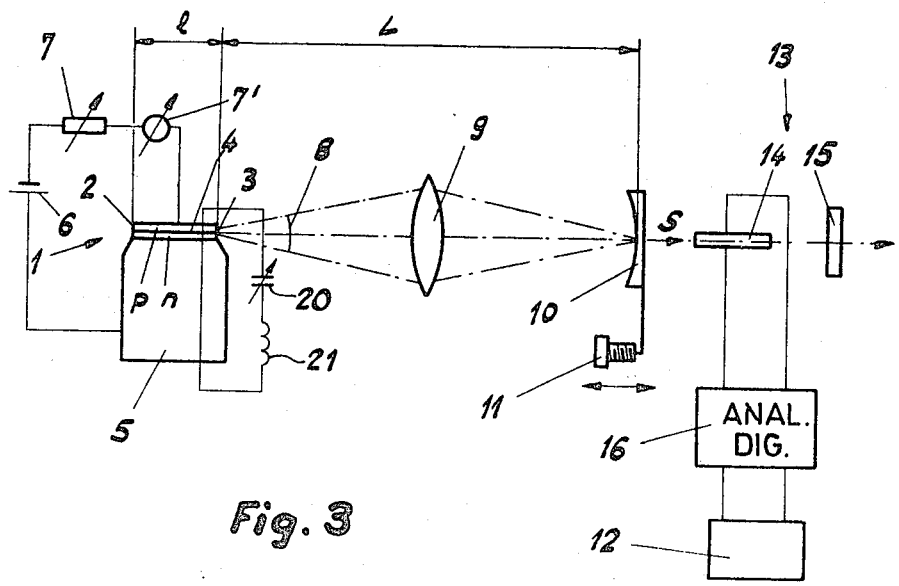
FIG. 3 is a partially schematic and partially block diagram of a modulation circuit associated with lasers in accordance with the invention.

With the aid of the circuit shown in FIG. 3, patterns can be obtained according to curve $b$ or $c$ or some intermediate form. The irregular pattern of curve $a$ arises from the fact that a laser oscillator can oscillate in various axial optical intrinsic or mode-frequencies at which the oscillations are more or less fortuitously amplified and again attenuated.

Figure 2:
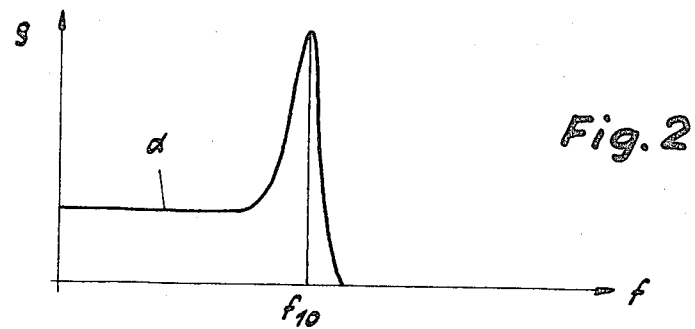
FIG. 2 is a chart showing the noise power dissipation of the beam of a diode laser in terms of frequency.

In FIG. 2, curve $d$ shows the spectral response of the noise intensity $p$ of a diode laser in terms of the noise frequency $f_1$. The individual points of this curve are measured, for example, such that the output voltage of a photodiode, on which the laser beam falls, feeds a bandpass filter with narrow band of variable passing frequency $f_1$ and measures the filter output current while varying $f_1$.

It is known that curve $d$ has a sharp maximum at a frequency $f_{10}$, where $f_{10}$ lies in a range somewhere between $10^9$ and $10^{10}$ cps.

It is further known that the coupling of the phases of the simultaneously appearing axial natural (intrinsic) frequencies can be obtained through the modulation of the laser energizing current by the frequency $f_2$, which equals the difference of two consecutive axial natural (intrinsic) frequencies or integral multiples (harmonics) thereof. Thereby the component with the frequency $f_2$ in the noise spectrum is favored and a stable modulated output power is obtained according to curves $b$ or $c$ of FIG. 1 with an essentially diminished noise factor. Instead of modulating the energizing current of the diode laser itself by the frequency $f_2$, the frequency $f_2$ can be supplied by the coupling on of an external laser resonator, the frequency of which is tuned to $f_2 = f_{10}$.

In the circuit shown in FIG. 3, care is taken that $f_2 = f_{10}$ thereby securing a steady modulation of the type of curve $b$ or curve $c$.

The circuit according to FIG. 3 comprises a conventional diode laser 1, constituted for example of a gallium arsenide crystal, which has two terminal specular surfaces 2 and 3 limiting the resonator cavity and a p-n transition layer 4.

Diode 1 is fastened to a copper plate 5 cooled to a very low temperature, and is excited by a circuit which contains a battery 6 of, for example, 1.5 volts, an adjustable resistance 7 and an ammeter 7'. The slightly divergent beam of laser rays 8 issuing from surface 3, which is only incompletely specular, is focused by means of a lens 9 on the center of a concave reflector 10, which together with reflecting surface 3 defines a second resonator cavity of length L. A micrometer screw 11 allows mirror 10 to be moved back or forth as indicated by the way arrow.

For this circuit the following equation is valid:

$$f_2 = \frac{m \cdot c}{2\left\{l\left(n + v \cdot \frac{dn}{dv}\right) + L\right\}}$$

wherein $L$ is the length of the diode laser, n is the refractive index of the material constituting the diode laser, $v$ is the optical frequency, $c$ is the velocity of light and $m$ is an integer. For $m=1$, $f_2$ is the basic frequency of the resonator, or the difference frequency of two consecutive axial natural (intrinsic) frequencies. In the practice, only low values of m are used, particularly $m=1$.

Frequency $f_{10}$ can be varied within certain limits by adjustment of the drive current of diode laser 1 with the help of the resistance 7 and, of course $f_{10}$ becomes greater, the when the drive current is stronger. Adjustment of resistance 7 and the micrometer screw 11 takes care of fulfilling the condition $f_2 = f_{10}$. Resonator 3, 10 can be regarded as a positive feedback of resonator 2, 3.

The action of the circuit is that the emergent ray $s$ transmitted through the less than fully reflecting mirror 10 exhibits an amplitude modulation with carrier frequency $f_{10}$. As two ranges of adjustment are provided, it is clear that the condition $f_2 = f_{10}$ can be fulfilled for various values of $f_{10}$. As an amplification of the drive current of diode laser 1 results in an amplification of $f_{10}$, mirror 10 must be shifted correspondingly so that $L$ is decreased. With comparatively large drive current, the modulation obtained is essentially of the nature of curve $b$ while, with a comparatively low drive current, it is essentially of the nature of curve $c$. As a fall in drive current also results in a decrease of laser output, the pulse modulation in accordance with curve $b$ is more important than the sinusoidal modulation according to curve $c$.

As the length L of the external resonator 3, 10 is about two orders of magnitude greater than the optical length of path $n \cdot l$ in diode 1, frequency $f_2$ can be well approximated by the following equation:

$$f_2 = (m \cdot c/2L)$$

Instead of the outer optical resonator or in addition to it, an electric circuit may be provided, which is to be connected parallel to the driving circuit 1, 7, 7', consisting of a capacitance 20 and an inductance 21, at least one of which is adjustable. By tuning of this electric resonance circuit of the frequency $f_{10}$, a stable modulation of the laser beam may also be obtained according to curve $c$.

If the modulated emergent ray $s$ is to be used for communications signalling, it can undergo a still further modulation from a communication source 12. For this purpose the ray $s$ is conducted through a lighting switch 13, comprising two components 14 and 15. Unit 14 for example consists of a lithium niobate crystal (LiNbO$_3$), which under the influence of a voltage impressed on it effects a rotation of the plane of polarization.

An analog-digital transducer 16 converts an amplitude modulated voltage supplied by communication source 12 into an output voltage which can assume only two values, which can be denoted for example by "0" and "1". On the value "0", switch 13 is light-transmissive; on value "1," it extinguishes the light. Transducer 16 is synchronized with frequency $f_{10}$, so that if a value "1" emerges at its output, this happens always in a time interval in which one of the curve $b$ pulses occurs. It is obvious that in this way information and data in any known digital code can be transmitted.

In case of need, several information sources can be connected with the analog-digital transducer 16, as the carrier frequency $f_{10}$ is sufficiently high for numerous communication channels.

With a sinusoidal carrier according to curve $c$, the output voltage of communication source 12 could be conducted directly to unit 14.

What is claimed is:

1. A method of modulating a laser beam which is produced by a diode laser which is energized by an adjustable electric current and which is provided with a resonator, said method comprising coupling a resonator to the diode laser and tuning the same to the frequency $f_{10}$ for which the intensity of noises of the diode laser is maximum at the adjusted energizing current.

2. A method according to claim 1, wherein the second resonator is an optical resonator with a length $L$, comprising adjusting the length $L$ to comply with the equation $$f_{10} = \frac{m \cdot c}{2\left\{l\left(n + v \cdot \frac{dn}{dv}\right) + L\right\}}$$

wherein:
  $m$ is an integer
  $c$ is the velocity of light
  $l$ is the length of the diode laser
  $n$ is the refractive index of the material of which the diode laser is composed
  $v$ is the optical frequency of the beam 3. Laser apparatus comprising a diode laser, energizing means for energizing the laser with an adjustable electric current, an optical resonator for the laser, and a second optical resonator coupled to the diode laser and transversed by the beam thereof, the length of said second resonator being adjustable according to the equation:

$$f_{10} = \frac{m \cdot c}{2\left\{l\left(n + v \cdot \frac{dn}{dv}\right) + L\right\}}$$

4. Apparatus as claimed in claim 3 comprising an electric resonance circuit in parallel with the energizing means.

5. Apparatus as claimed in claim 3 comprising means by which the emergent laser beam is modulated by carrier-frequency pulses.

6. Apparatus as claimed in claim 3 comprising means by which the emergent laser beam is sinusoidally modulated.

7. Apparatus as claimed in claim 3, wherein the second optical resonator comprises a specular surface and a partially translucent concave reflector between which is mounted a condenser lens, the emergent laser ray modulated by carrier frequence $f_{10}$ emerging from the second resonator through the partially translucent concave reflector.

8. Apparatus as claimed in claim 7 comprising a communication source, and a light switch mounted behind the concave reflector and controlled by said communication source.

9. Apparatus as claimed in claim 8 comprising means which rotates the plane of polarization of the laser beam under the influence of an electric field, and a consecutive polarization filter which transmits light from only one direction of polarization.

10. Apparatus as claimed in claim 9 comprising an analog-digital transducer between the communication source and the first-mentioned light-switch component and being synchronized with carrier frequency $f_{10}$ in order to extinguish those of the successive pulses which correspond to the communication signal according to a code.

11. Laser apparatus comprising a diode laser, energizing means for energizing the laser with an adjustable electric current, an optical resonator for the laser, and an electric resonance circuit coupled in parallel to the energizing means.

* * * * *